Nov. 28, 1950   J. DE PANGHER   2,531,807
MAGNETIC MEASURING APPARATUS AND METHOD
Filed Oct. 28, 1948
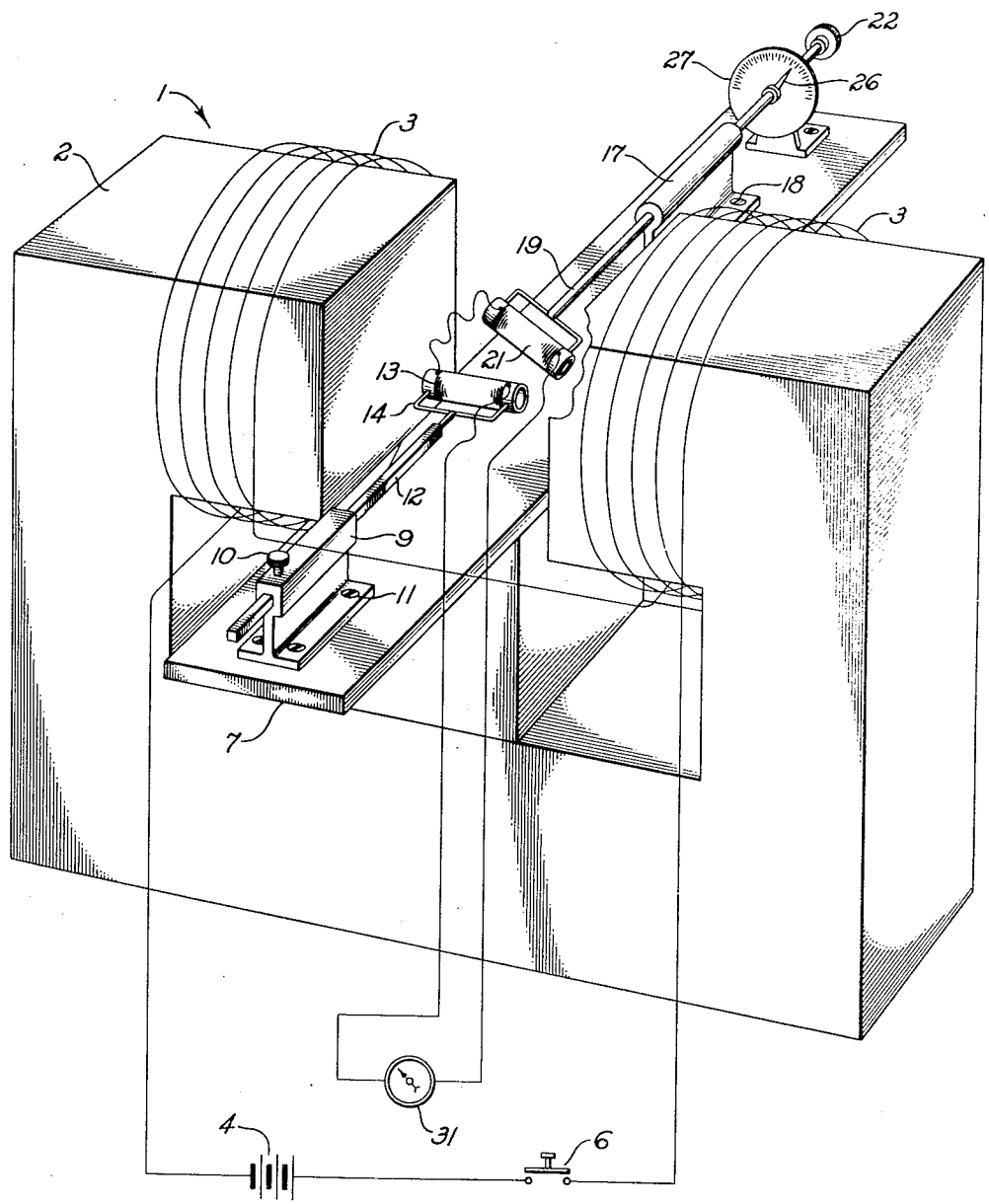
INVENTOR.
JOHN De PANGHER
BY
Roland A. Anderson
ATTORNEY.

Patented Nov. 28, 1950

2,531,807

UNITED STATES PATENT OFFICE 2,531,807

MAGNETIC MEASURING APPARATUS AND METHOD

John De Pangher, Berkeley, Calif., assignor to the United States of America as represented by the United States Atomic Energy Commission Application October 28, 1948, Serial No. 56,996

6 Claims. (Cl. 175—183)

The present invention relates to an improved method and apparatus for measuring the effective area of a coil. As employed herein, the effective area of a coil is taken to mean the summation over the entire coil of the area enclosed by the individual turns of the coil. The effective area of coils wound in a single uniform layer may be calculated with sufficient accuracy for most applications; however, the effective area of coils with many turns wound at random can only be approximated mathematically and other means must be employed to obtain a precise determination of the effective area.

It is therefore an object of this invention to provide an improved method of precisely measuring the effective area of a coil.

A further object is to provide an improved apparatus capable of measuring the effective area of a coil.

A further object is to provide an apparatus suitable for use in measuring the effective area of a coil, wherein the possibility of error on the part of the operating technician is minimized.

A further object is to provide an apparatus wherein a coil in question is compared to a standard coil and the effective area of the first coil obtained therefrom.

Many practical applications of coils require an exact determination of the effective area of the coil and in the instance of coils wound with fine wire, the problem is difficult. The actual placement or position of the individual wires in the coil is exceedingly difficult to determine as is, consequently, the area enclosed by these wires. Furthermore, the exact value of the effective area is in many cases of prime importance. For example, in certain installations search coils used to determine the strength of a magnetic field must provide results accurate within one-tenth of one percent. The present invention provides means for obtaining this required accuracy in the determination of the effective area of a coil.

In order to clarify the disclosure of the principles and methods presented in this invention, the description is referenced to one particular embodiment of the invention as shown in the attached drawing which is a schematic perspective view of this embodiment.

Referring to the drawing it is to be noted that an electromagnet 1, comprising a core 2 and electrical windings 3, is energized by a battery 4 through a switch 6. A plate 7 is secured to the magnet core 2, a support 9 is mounted upon the plate 7 by means of screws 11, and an arm 12 is slidably attached to the support 9, a set screw 10 being provided to maintain the arm 12 at various positions between the pole faces of electromagnet 1. A clamp 14 is attached to the end of the arm 12 and is adapted to engage a coil 13 so as to fix the longitudinal axis of coil 13 normal to the arm 12. Coil 13, in the illustrated embodiment of the invention, is one in which the effective area is to be determined, and is hereinafter referred to as the test coil. The test coil 13 may be secured to the arm 12 either by the clamp 14 or any other suitable means allowing facile detachment. Housing element 17 is attached to the plate 7 by screws 18, shaft 19 being rotatably mounted in housing element 17. The shaft 19 and bar 12 have a common center line which passes through the midpoint of the magnet gap and is parallel to the magnet pole faces. A standard coil 21 of known effective area is attached normal to the end of shaft 19 which extends into the magnetic field, both coils then being well within the homogeneous magnetic field between the magnet pole faces. A knob 22 is attached to the opposite end of the shaft 19 providing a means thereby to readily rotate the shaft 19. Between said knob 22 and the support 17 a pointer 26 is rigidly joined to shaft 19. Adjacent the pointer 26 a dial 27 is mounted for registry with pointer 26 and secured to the plate 7. The dial is marked so that an indication of the degree of rotation of the standard coil 21 may be obtained from the position of the pointer 26 relative to the dial 27.

The two coils are electrically connected in bucking relation, that is to say, the induced charge in one opposed the induced charge in the other. Assuming both coils 13 and 21 to be wound the same, the illustrated embodiment shows the coils connected in bucking relation. A charge responsive element such as a ballistic galvanometer 31 is connected between the coils to indicate the charge differential between the coils.

The two coils 13 and 21 thus are suspended within the field of the magnet 1, the test coil 13 being oriented perpendicular to the magnet pole faces and the standard coil 21 being attached to a shaft 19 which is mounted for rotation, thereby allowing the angle between the longitudinal axis of the standard coil 21 and the magnet pole faces to be varied as desired.

Considering the operation of the present invention and assuming a standard coil 21 of known effective area to be connected to the end of shaft 19, connections are made from each end of the standard coil 21 to opposite sides of the galvanometer 31. The standard coil is originally positioned with its axis making an approximately ninety-degree angle with the magnetic field. This angle is then varied by rotating the standard coil from one position to another until such an angle exists between the axis of the standard coil and the magnetic field that establishment of the magnetic field by the battery 4 produces no reading at the galvanometer 31. In this position no charge is induced in the standard coil by varying the magnetic field. The angular position of the standard coil for this condition, as indicated by the pointer 26 on the dial 27, is recorded as the standard coil zero reading R for the particular standard coil used.

Following determination of the standard coil zero reading as described above, the test coil 13 is attached to the end of the arm 12 and placed in position, parallel to the magnetic field as shown, and the set screw 10 tightened to maintain the coil 13 in this position. The two coils 13 and 21 are then electrically connected in series through the galvanometer 31, the connections being such that the charges induced in the coils by the magnetic field are opposing. The push button switch 6 is momentarily closed and then opened allowing current to flow for a short interval of time from the battery 4, through the magnet windings 3, and back to the battery 4. This momentary current flowing through the magnet windings 3 causes a magnetic field to build up and then collapse between the magnet pole faces. This variation of the magnetic field induces an electric charge within the coils 13 and 21, and as they are connected in bucking relationship through the ballistic galvanometer 31, the algebraic sum of the charges induced in the coils will be indicated by the meter 31. The above procedure is repeated with the standard coil 21 being rotated between each operation until the angle between the axis of the standard coil and the magnetic field is such that the galvanometer 31 indicates a zero reading. At this point each coil is producing the same amount of charge. The angular position X of the standard coil 21 at this point of equal charge is recorded. The effective area of the test coil 13 may then be calculated as the effective area of the standard coil 21 times the sine of the angular difference between the standard coil zero reading R and the position of balanced charge X. Thus mathematically $$A_t = A_s \sin(X-R)$$

where:
$A_t$ = effective area of test coil
$A_s$ = effective area of standard coil $(X-R)$ = actual angular displacement between the X and R position of the standard coil It is to be noted that care must be exercised to rotate the standard coil in such a direction that the charged induced in the standard coil 21 opposes the charge induced in the test coil 13, that is to say, that they are actually electrically connected in bucking relationship. Furthermore, the zero reading for any one standard coil need only be determined once and this value used in all subsequent calculations concerning the same standard coil.

As depicted, the dial 27 is calibrated in degrees and the angles corresponding to the two above-described standard coil positions obtained therefrom. However, the dial may be rotatably mounted so that the dial 27 may be rotated to compensate for any deviation of the standard coil zero reading from ninety degrees. Also the dial 27 may be calibrated directly in effective area for any particular standard coil, it then being necessary to change dials or recalibrate the dial at any time another standard coil is to be used.

It is to be further noted that the only readings necessary during operation of the apparatus are those at the meter 31 and that it is only necessary to note the presence of any movement of the meter indicator and thus the possibility of error on the part of the operating technician in reading the meter is greatly minimized.

It will of course be appreciated that the above description assumes the effective area of the standard coil to be greater than that of the test coil; however, if such is not the case the two coils may be interchanged so that the standard coil is parallel to the magnetic field and the test coil rotatably mounted therein.

Although the above disclosure is referenced to a particular embodiment, it is apparent that numerous other embodiments are possible within the scope of the invention. One such embodiment is the utilization of the invention to check a number of coils of supposedly identical effective area. In this case the standard coil is fixed at the proper angle and test coils are inserted successively in the same relation to the standard coil, it then being only necessary to watch the meter to determine whether any of the test coils do not have the required effective area.

What is claimed is:

1. In a method of determining the effective area of a coil, the steps comprising connecting a standard coil and a coil of unknown effective area in bucking relationship, applying a charge inducing force at known angles to the axes of said coils, varying the angle between the axes of said coils until equal charges are induced in each coil, and determining said angle for said condition of equal charges.

2. In a method of determining the effective area of a coil, the steps comprising establishing a homogeneous magnetic field, orienting a coil of unknown effective area within said magnetic field and having the axis thereof parallel to said magnetic field, placing a standard coil of known effective area perpendicular to and within said magnetic field, connecting said coils in bucking relationship through a galvanometer, varying said magnetic field, decreasing the angle between the axis of said standard coil and said magnetic field until zero reading is indicated by said meter upon varying the magnetic field, and determining the angle between the axis of said standard coil and said magnetic field.

3. An apparatus for determining the effective area of a test coil, comprising in combination a standard coil of known effective area and a test coil, means to vary the angular disposition of the axes of said coils with respect to each other, connections electrically joining said coils in bucking relationship, an electrical charge responsive element connected between said coils, and means simultaneously applying a charge inducing force at known angles to the axes of said coils.

4. An instrument for measuring the effective area of a test coil including means establishing a variable magnetic field, a standard coil of known effective area and a test coil situated in known positions within said magnetic field and electrically connected in bucking relationship, a ballistic galvanometer electrically connected between said coils, and means to vary the angle between the axis of the standard coil and the magnetic field.

5. An apparatus for determining the effective area of a test coil comprising in combination a standard coil of predetermined effective area electrically connected in bucking relationship with said test coil, a charge responsive element connected between said test coil and said standard coil, means applying an electric charge inducing force parallel to the axis of said test coil and perpendicular to the axis of said standard coil, and means for decreasing the angle between the axes of said standard coil and said charge inducing force.

6. An apparatus for determining the effective area of a coil comprising in combination means establishing a homogeneous magnetic field, means to vary said magnetic field, a coil of unknown effective area placed within and parallel to said magnetic field, a standard coil of known effective area placed within and perpendicular to said homogeneous magnetic field, means to vary the angle of the axis of said standard coil with respect to said magnetic field, further means attached to said standard coil to indicate thereby the amount of said angle, means electrically connecting said coils in bucking relationship, and a meter connected therebetween indicating difference of charge induced in said coils by the variation of said magnetic field.

JOHN DE PANGHER.

REFERENCES CITED

The following references are of record in the file of this patent:

UNITED STATES PATENTS

| Number | Name | Date |
| --- | --- | --- |
| 1,992,100 | Stein | Feb. 19, 1935 |
| 2,237,254 | Broekhuysen | Apr. 1, 1941 |
| 2,311,715 | Thorne | Feb. 23, 1943 |
| 2,432,948 | Thompson | Dec. 16, 1947 |